3,120,534
10-METHOXYYOHIMBANE
John Shavel, Jr., Mendham, and Maximilian von Strandtmann, Rockaway Township, N.J., assignors to Warner-Lambert Pharmaceutical Company, Morris Plains, N.J., a corporation of Delaware
No Drawing. Filed Sept. 6, 1961, Ser. No. 136,181
1 Claim. (Cl. 260—288)

The present invention relates to new and novel 10-substituted derivatives of yohimbane alkaloids having the formula

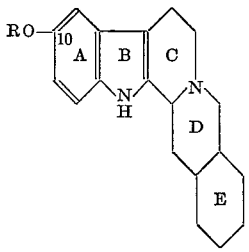

wherein R is hydrogen or lower alkyl and to the non-toxic pharmaceutically acceptable acid addition and quaternary ammonium salts thereof.

The compounds of this invention have significant and interesting pharmacological activity as analgesics and tranquilizers. In addition, these compounds are valuable intermediates in the production of other compounds of the yohimbane series.

The compounds of this invention bear the A, B, C, D and E rings as depicted in the above structural formula and are, generally, alkaloids of the yohimbane series. Depending upon the configuration of the hydrogen atom at the 3- position and the existence of cis or trans fusion of the D and E rings, four different configurations are possible, that is yohimbane, 3-epiyohimbane, alloyohimbane and 3-epialloyohimbane. The present invention includes within its scope derivatives of these four families of alkaloids bearing —OR substituents at the 10-position.

In application of John Shavel, Jr., Serial No. 136,182, filed concurrently herewith, there are described certain amines of the formula

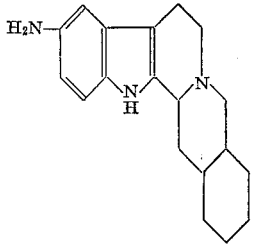

In our application entitled "10-Haloyohimbane Alkaloids and Process Therefor," filed concurrently herewith, we describe the diazotization of amines of the above formula to form the corresponding diazonium halide salts.

We have now found that said diazonium halide salts may be converted to the compounds of our invention having the formula

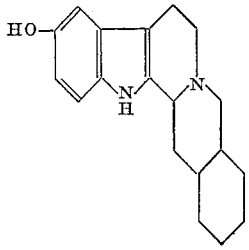

by heating an aqueous acid solution thereof until test shows absence of diazonium function. The product is recovered by making the solution basic, extracting with an organic solvent such as chloroform and evaporating. The product is purified by crystallization.

Treatment of the 10-hydroxy compounds of our invention with a diazo-lower alkane at room temperature in a solvent such as a mixture of methanol and ether results in the formation of the 10-lower alkoxy compounds of our invention. The product is recovered by evaporating the filtered reaction mixture and is purified by crystallization.

The compounds of this invention may be converted into their pharmaceutically acceptable non-toxic acid addition or quaternary ammonium salts. Useful acid-addition salts are those formed with such acids as maleic, fumaric, benzoic, succinic, methylsulfonic, sulfonic, citric, tartaric, salicylic, malic, cinnamic, hydrochloric, hydrobormic, phosphoric and the like. The acid addition salts may be prepared in the conventional manner, for example, by treating a solution of suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like.

The following examples are included in order further to illustrate the present invention:

*Example 1.—10-Hydroxyyohimbane*

To a solution of 7.72 g. 10-aminoyohimbane dihydrochloride monohydrate in 350 ml. water and 10 ml. concentrated hydrochloric acid is added a solution of 1.6 g. sodium nitrite in 50 ml. water dropwise with stirring over a period of about one hour. The temperature is maintained at 2 to 5° C. The mixture is stirred at the reaction temperature and the excess reagent is decomposed by the addition of urea.

The above described solution of 10-diazoniumyohimbane chloride is added in a slow stream to 0.5 L of boiling water, to which a few crystals of $CuSO_4$ and 1 ml. of conc. HCl are added. Boiling is continued until, after 30 min., a sample of the reaction mixture gives no red or pink color upon treatment with β-naphthol in alkaline medium. The solution is cooled, basified with ammonia and extracted with three 250 ml. portions of chloroform. The combined extracts are dried over $NaSO_4$ and evaporated in vacuo. The residue is recrystallized from chloroform-ethanol mixture. Yield: 0.346 g., M.P. 258–263°, $[\alpha]_D^{25}$ —93°, 0.4% pyridine.

*Analysis.*—Calc.: C, 76.99; H, 8.16; N, 9.45. Found: C, 76.84; H, 8.30; N, 9.27.

*Example 2.—10-Methoxyyohimbane*

To a suspension of 0.280 g. 10-hydroxyyohimbane in 20 ml. methanol, 30 ml. of an ethereal $CH_2N_2$ solution is added. The mixture is stirred until a complete solution is obtained and allowed thereafter to stand until complete conversion. The solution is filtered and evaporated in vacuo. The residue is recrystallized from methanol. Yield: 0.2 g., M.P. 231–234° (mixed M.P. with 10-hydroxyyohimbane; 205–207°), $[\alpha]_D^{25}$ —96°, 0.7% pyridine.

*Analysis.*—Calc.: C, 77.38; H, 8.44; N, 9.03. Found: C, 77.21; H, 8.47; N, 8.91.

In the foregoing examples, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

We claim:
10-methoxyyohimbane.

References Cited in the file of this patent

UNITED STATES PATENTS 2,857,385     Kuehne _____ Oct. 21, 1958

FOREIGN PATENTS 824,496     Great Britain _____ Dec. 2, 1959

OTHER REFERENCES

Thomas: Chemistry and Industry (1954), pages 488 and 489.

Huebner: Chemistry and Industry (1955), page 1186.

Manske: The Alkaloids, Academic Press, New York, volume VII (1960), pages 51 and 62.